United States Patent
Cooley et al.

(10) Patent No.: US 7,846,378 B2
(45) Date of Patent: Dec. 7, 2010

(54) PREPARATION OF A DENSE, POLYCRYSTALLINE CERAMIC STRUCTURE

(75) Inventors: Jason Cooley, Los Alamos, NM (US); Ching-Fong Chen, Los Alamos, NM (US); David Alexander, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 59 days.

(21) Appl. No.: 12/322,292

(22) Filed: Jan. 29, 2009

(65) Prior Publication Data

US 2009/0243164 A1 Oct. 1, 2009

Related U.S. Application Data

(60) Provisional application No. 61/072,684, filed on Apr. 1, 2008.

(51) Int. Cl.
*B28B 3/00* (2006.01)
(52) U.S. Cl. .......................................... 264/604
(58) Field of Classification Search .............. 264/606, 264/604
See application file for complete search history.

(56) References Cited

U.S. PATENT DOCUMENTS

| | | | |
|---|---|---|---|
| 5,600,989 A | 2/1997 | Segal et al. | |
| 6,399,215 B1 * | 6/2002 | Zhu et al. | 428/544 |
| 6,908,517 B2 | 6/2005 | Segal et al. | |
| 7,544,259 B2 * | 6/2009 | Funaki et al. | 148/683 |
| 2005/0205176 A1 * | 9/2005 | Funaki et al. | 148/686 |
| 2010/0021334 A1 * | 1/2010 | Funaki et al. | 419/12 |

OTHER PUBLICATIONS

Rimma Lapovok and Dacian Tomus, Production of Dense Compact Billet From Ti-Alloy Powder Using Equal Channel Angular Extrusion. ARC Centre of Excellence for Design in Light Metals Dept. of Materials Engineering, Monash University Clayton, Melbourne, VIC 3800, Australia. Apr. 6, 2007.*

Cathleen Ruth Hutchins, Consolidation of Copper and Aluminum Micro and Nanoparticles Via Equal Channel Angular Extrusion, Texas A&M University. Aug. 2007.*

Kaculi et al., "Use of Mechanical Alloying and Equal Channel Angular Extrusion to Produce a Nanostructured Titanium Silicide," Processing and Fabrication of Advanced Materials XII (Oct. 2003) pp. 315-329.

Yoon et al., "Achieving Both Powder Consolidation and Grain Refinement for Bulk Nanostructured Materials, by Equal-Channel Angular Pressing," Key Eng. Mat., vol. 345-346 (Aug. 2007) pp. 173-176.

Jiang et al., "Optically Transparent Polycrystalline $Al_2O_3$ Produced by Spark Plasma Sintering," Journal of the American Ceramic Society, vol. 91 (Jan. 2008) pp. 151-154.

* cited by examiner

Primary Examiner—Matthew J. Daniels
Assistant Examiner—Russell J Kemmerle, III
(74) Attorney, Agent, or Firm—Samuel L. Borkowsky

(57) ABSTRACT

Ceramic nanopowder was sealed inside a metal container under a vacuum. The sealed evacuated container was forced through a severe deformation channel at an elevated temperature below the melting point of the ceramic nanopowder. The result was a dense nanocrystalline ceramic structure inside the metal container.

6 Claims, 5 Drawing Sheets

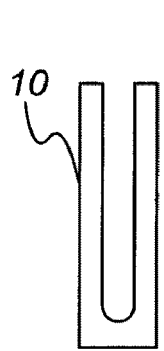 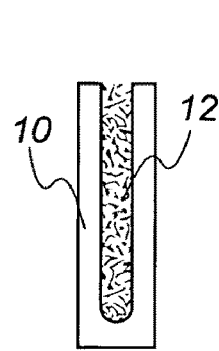 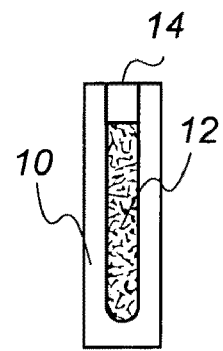 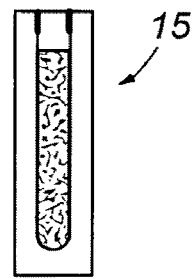
Fig. 1a  Fig. 1b  Fig. 1c  Fig. 1d
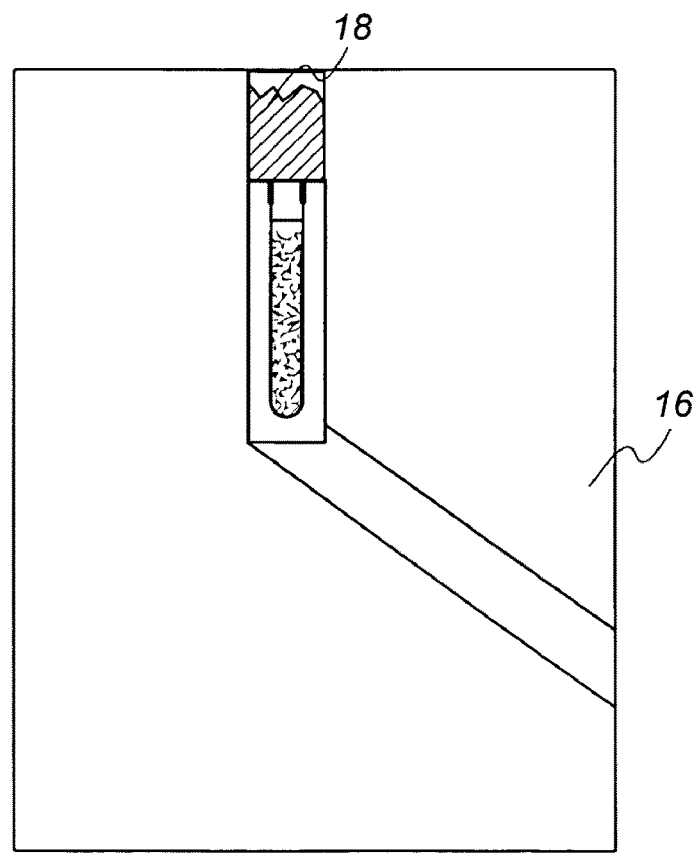
Fig. 2

US 7,846,378 B2

PREPARATION OF A DENSE, POLYCRYSTALLINE CERAMIC STRUCTURE

RELATED APPLICATIONS

This application claims the benefit of U.S. Provisional Patent Application Ser. No. 61/072,684 filed Apr. 1, 2008 entitled "DENSIFICATION OF CERAMICS VIA A SEVERE DEFORMATION PROCESS," incorporated by reference herein.

STATEMENT REGARDING FEDERAL RIGHTS

This invention was made with government support under Contract No. DE-AC52-06NA25396 awarded by the U.S. Department of Energy. The government has certain rights in the invention.

FIELD OF THE INVENTION

The present invention relates generally to forming dense, polycrystalline, ceramic structures from ceramic powder.

BACKGROUND OF THE INVENTION

Nanocrystalline ceramic structures have a grain size of 100 nanometers ("nm") or less. They can exhibit superior properties over their coarser polycrystalline (i.e. many grained) counterparts, and are attractive for many different areas including optical, microelectronic, magnetic, structural, thermal, electric, chemical, and refractory applications.

Nanocrystalline ceramic structures may be formed by sintering ceramic nanopowder (i.e. powder with particle sizes of about 100 nm or less), which typically involves heating ceramic powder or a green body made from ceramic powder to a temperature below the melting point, sometimes under pressure. The final sintered structure is polycrystalline.

All conventional sintering methods cause some grain growth that can result in grains much larger than those of the starting nanopowder.

SUMMARY OF THE INVENTION

In accordance with the purposes of the present invention, as embodied and broadly described herein, an aspect of the present invention relates to a process for forming a dense, ceramic, polycrystalline structure from ceramic powder, comprising sealing ceramic powder inside a metal container under a vacuum, and then forcing the sealed, evacuated container through a severe deformation channel at an elevated temperature below the melting temperature of the ceramic powder, whereby a dense ceramic polycrystalline structure is formed inside the container. When the ceramic powder inside the metal container is ceramic nanopowder, the dense polycrystalline structure formed inside the metal container is a dense, nanocrystalline ceramic structure.

The invention also includes an apparatus for forming dense, ceramic, crystalline structures from ceramic powder. The apparatus includes a plurality of sealed, evacuated metal containers filled with ceramic powder and an equal channel angular extrusion means for extruding the sealed, evacuated metal containers. A conveyor belt means receives the sealed, evacuated metal containers filled with ceramic powder at one end of the conveyor belt means and sends them to the other end of the conveyor belt means. Also included is a means for heating, on the conveyor belt means, the sealed, evacuated metal containers that are filled with ceramic powder. A robotic arm means transports a heated, sealed, evacuated metal container of ceramic powder from the conveyor belt means to the equal channel angular extrusion means for extrusion.

The invention also includes a process for continuously forming dense, ceramic, polycrystalline structures from ceramic powder. The process involves feeding ceramic powder into a channel of an equal channel angular extrusion die, the ceramic powder blocked from flowing through the die by a movable spacer resting on a dense object inside the channel, the die heated at a temperature below the melting temperature of the ceramic powder in the die, and after a desired amount of powder has been fed into the die, compressing the powder inside the channel and then forcing the compressed powder through the die, whereby a dense, ceramic polycrystalline structure is formed.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIGS. 1a-d show a series of cross-sectional sketches showing preparation of a sealed metal container with ceramic powder inside, which include (a) an empty metal container, (b) ceramic powder inside the container, (c) plugging the container, and (d) sealing the plug to the container.

FIG. 2 shows a sketch of the sealed container of FIG. 1 inside an equal channel angular extrusion ("ECAE") die.

DETAILED DESCRIPTION

Figure 3:
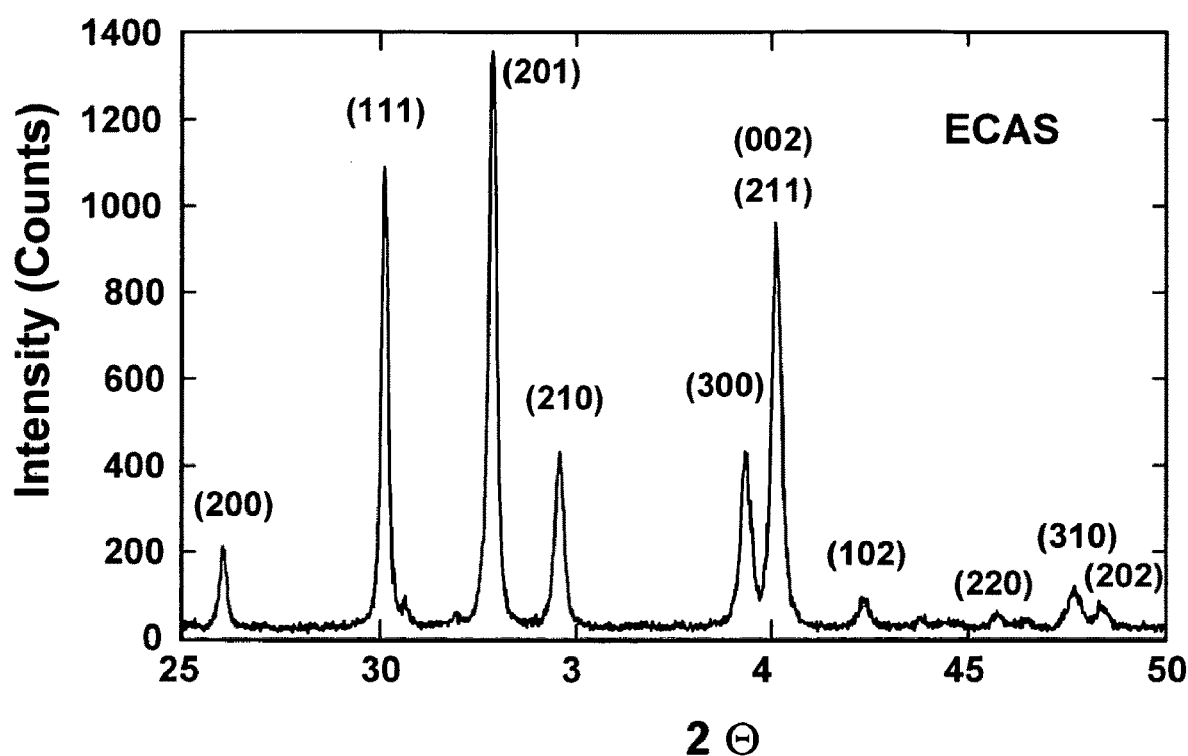
FIG. 3 shows an x-ray diffraction pattern of a dense structure of $La_{0.95}Ce_{0.05}Br_3$ after extrusion.

The invention involves producing a dense, crystalline, ceramic structure from ceramic powder. Preferably, the structures are nanocrystalline and are formed from ceramic nanopowder.

When the ceramic powder is nanopowder, the invention involves sealing an evacuated metal container with ceramic nanopowder inside and then forcing the sealed metal container through a severe deformation channel at an elevated temperature below the melting point of the ceramic nanopowder. The result is a dense nanocrystalline ceramic structure inside the metal container.

Reference will now be made in detail to embodiments of the invention. Similar or identical structure is identified using identical callouts. FIG. 1a-d show a series of sketches for preparation of the sealed container. FIG. 1a shows a sketch of the empty container 10. In a demonstration embodiment, the container was made of nickel and had an outer diameter of 10 mm and an inner diameter of 7 mm.

FIG. 1b shows container 10 filled with nanopowder 12. In the demonstration embodiment, the ceramic nanopowder was $La_{0.95}Ce_{0.05}Br_3$ having a melting point of 780° C. and an average particle size of about 50 nanometers. The container was filled by placing some of the nanopowder inside, then tapping to compress the powder inside, and adding additional nanopowder and tapping until the level of the powder is nearly flush with the opening at the top of the container.

FIG. 1c shows a sketch of the container after a plug 14 is inserted into the open end of container 10. In this embodiment, both the plug and container were heated at elevated temperature for drying before filling the container with $La_{0.95}Ce_{0.05}Br_3$ nanopowder.

FIG. 1d shows the container after the plug is welded on to seal the container. In the demonstration embodiment, the plugged container of FIG. 1c was transferred to an electron-beam welding machine, evacuated, and welded shut under a vacuum. The evacuation prior to sealing was to prevent gas bubbles from forming inside the container during the extrusion. Gas bubbles it was believed could have a negative affect on forming a dense structure inside the container. The now vacuum-sealed container was heated to 700° C. for 1 hour.

As the vacuum-sealed container was being heated to 700° C., a die 16 with a severe deformation channel was being heated to 500° C. After the container and the die temperatures stabilized, the container was placed into the die. FIG. 2 shows the sealed container inside the die. Die 16 is part of a larger device known in the art as an equal channel angular extrusion ("ECAE") device. ECAE devices are well known in the art of metallurgy for processing billets of solid metal. In this invention, this ECAE device is used to process a sealed container of ceramic nanopowder. In the demonstration embodiment, the angle between the channels in the die was 120°. Dies with different angles (90°, for example) are also available, and it should be understood that the invention should not be limited to a particular ECAE device or to a die with a particular angle between the channels. ECAE devices such as the one used here are equipped with a plunger 18 that forces whatever is being extruded through the die. ECAE devices are typically used with metal billets where the billet is forced through the die. In this embodiment, it is the sealed container of ceramic nanopowder that is forced through the die. In this demonstration embodiment, a forward force of about 8000-10000 pounds was applied to the sealed end of the container, and a backward force of about 1000 pounds was applied to the other end of the container. The result was that the container was forced through the heated die over a period of about 30-60 seconds. It should also be understood that the invention should not be limited to containers with a particular wall thickness, to any particular forces for forcing the sealed container through the die, or to any particular ceramic material. Thus, although the invention has been demonstrated using $La_{0.95}Ce_{0.05}Br_3$ nanopowder, it should be understood that other ceramic materials could be used. For the purposes of this invention, nanopowder was used because a dense, nanocrystalline ceramic structure was a desired end product.

It should also be understood that the invention should not be limited to any particular container wall thickness or container material, as other wall thicknesses or materials could also be used. The wall thickness and container materials were chosen so that the container, which obviously deforms during the extrusion, does not break during the extrusion. The applied force should be sufficient to force the sealed container through the die. Although a backward force was applied during the extrusion for the demonstration embodiment, the extrusion can also be performed without a backward force.

Figure 4:
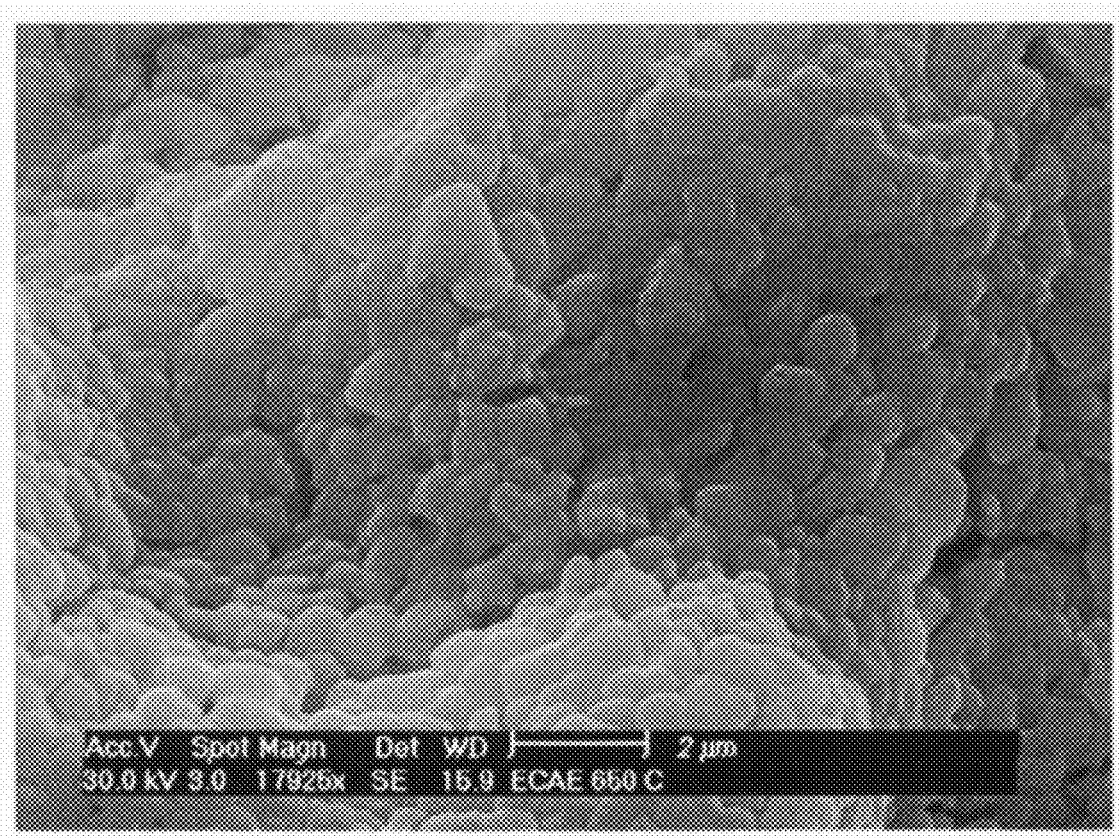
FIG. 4 shows a scanning electron micrograph ("SEM") of a dense structure of $La_{0.95}Ce_{0.05}Br_3$ after extrusion.

The invention involves densifying ceramic nanopowder at elevated temperature and pressure, and therefore is a sintering process that may be referred to as equal channel angular sintering ("ECAS"). ECAS is a dynamic process because the sintering takes place as the container of nanopowder moves through the channel. After a single pass through the die, the container was removed from the die, allowed to cool, then moved into a glovebox and then cut into 3 mm-width slices. The cutting was performed inside the glovebox using a slow cutting saw without coolant. Each of the slices included a periphery of metal from the can that surrounded a translucent dense ceramic core. An x-ray diffraction spectrum of the dense ceramic $La_{0.95}Ce_{0.05}Br_3$ is shown in FIG. 3, and scanning electron micrograph ("SEM") of it is shown in FIG. 4. From these images, the dense structure appears to be fully dense. From the x-ray diffraction pattern, the average grain size is estimated to be about 50 nm using the Debye-Scherrer method. Most of the grains appear to be from about 30 nm to about 80 nm.

The dense $La_{0.95}Ce_{0.05}Br_3$ emitted a bright blue light when exposed to ultraviolet light at a wavelength of 230 nm. The product light that was comparable to emitted from a single crystal of $LaBr_3$:Ce.

Figure 5:
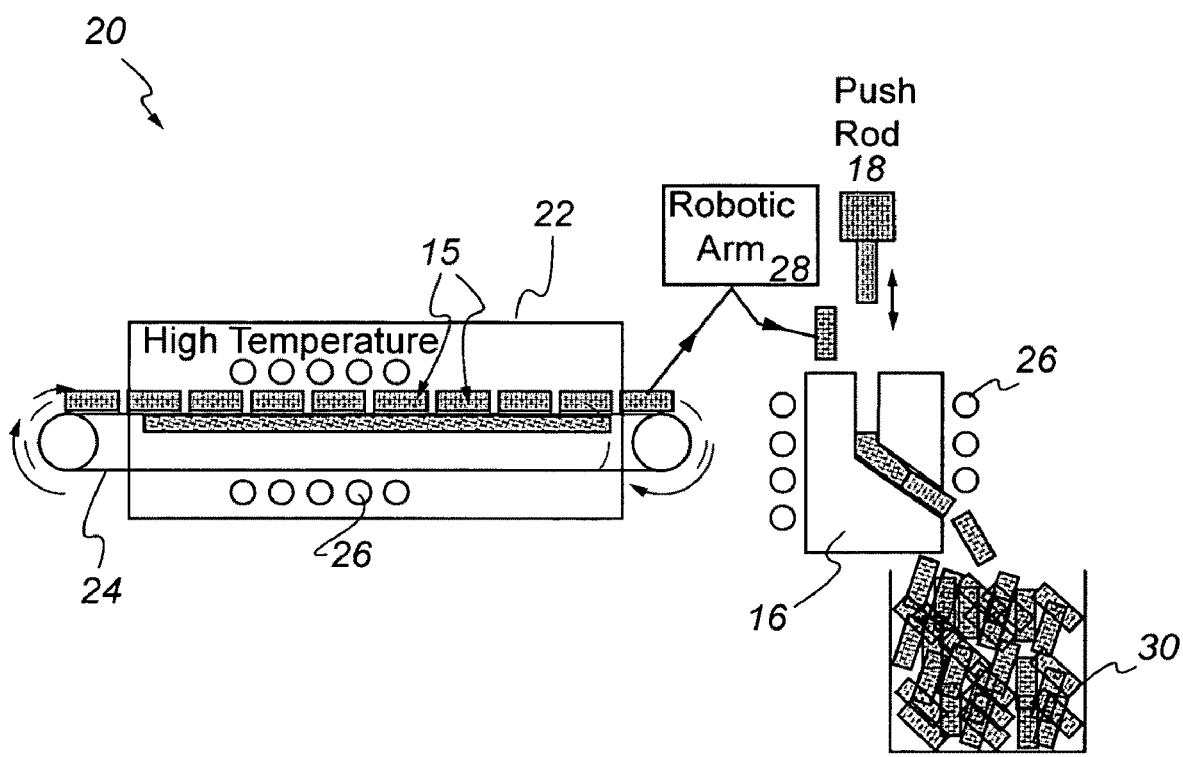
FIG. 5 shows a sketch of an apparatus for continuous feeding and equal channel angular extrusion.

FIG. 5 shows a sketch of an apparatus 20 for continuous feeding and extrusion. Apparatus 20 includes furnace 22 for heating the sealed, evacuated metal containers 15 with ceramic nanopowder inside, and conveyor belt 24 for transporting them toward the die 16. Induction coils 26 are for heating die 16. It should be understood that other heating means could also be used, such as electrical resistance coils or gas flames. A robotic arm 28 provides a feed mechanism that transports a metal container from the conveyor belt to the die at a controlled rate. The robotic arm loads the metal container into a channel in the die. A push rod 18 i.e. a plunger, forces the metal container through the die, and a collector 30 receives the extruded metal container. A feed mechanism such as a mechanical arm can load the cans at a controlled rate into the die.

Figure 6:
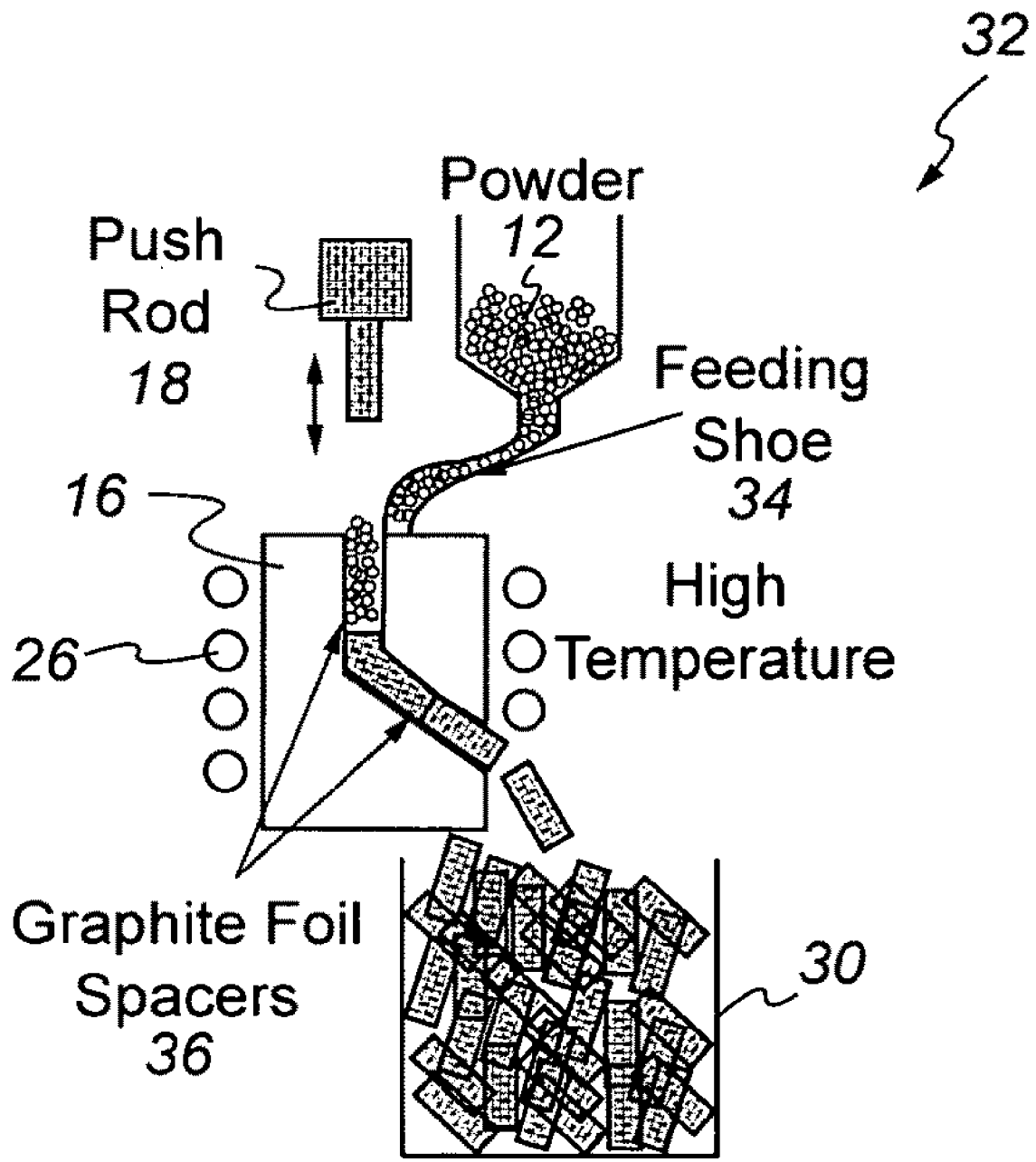
FIG. 6 shows an embodiment apparatus for processing nanopowder without the use of metallic containers.

FIG. 6 shows an apparatus 32 for extrusion of ceramic powder without metal containers. Ceramic nanopowder 12 is sent through a feeding shoe 34 to the channel. A graphite foil spacer 36 inside the die prevents the powder from moving through the die. When a desired amount of powder is added, one or two or several graphite spacers 36 are placed on top of the powder. Die 16 meanwhile is being heated at an elevated temperature using induction coils 26. When the powder reaches a desired temperature, push rod 18, i.e. a plunger, compresses the powder and forces it though the deformation channel in die 16. The separators can be made of boron nitride or other suitable material instead of graphite, and they separate each of the densified parts as they are extruded through the die. The densified ceramic structures are collected in a collector 30. The first extrusion may involve inserting a dense object such as a metal billet or metal container into the die to prevent powder from flowing through the die, so the dense object would be extruded first, followed by the first sample of ceramic powder, spacers, the second sample of ceramic powder, the third sample of ceramic powder, etc.

Without wishing to be bound by any explanation, it is believed that if some grain growth did occur while the nanopowder was heated prior to extrusion, the effect of the equal channel angular extrusion was to refine the grain size during the extrusion. Although the temperatures were below the melting temperature of the ceramic, they were still high enough where some grain growth would have been expected because other sintering processes such as pressureless sintering, hot-pressing, hot isostatic pressing, microwave sintering, spark-plasma sintering, and the like, are known to result in larger grain sizes. In ECAS, the product obtained is nanocrystalline and the grain sizes appear to be on the order of the particle sizes of the starting ceramic powder.

The foregoing description of the invention has been presented for purposes of illustration and description and is not intended to be exhaustive or to limit the invention to the precise form disclosed, and obviously many modifications and variations are possible in light of the above teaching. For example, the invention is more generally a process for sintering ceramic powder that is not necessarily nanopowder, i.e. the invention is also meant to include ECAS of ceramic powders larger than 100 nm. Micron-sized powder, for example, may be used instead of nanopowder. In situations where the powder is larger than nanopowder, the expected product may not necessarily be nanocrystalline, but it is expected to be at least a dense, polycrystalline, ceramic structure.

The embodiments were chosen and described in order to best explain the principles of the invention and its practical application to thereby enable others skilled in the art to best utilize the invention in various embodiments and with various modifications as are suited to the particular use contemplated. Although the invention has been disclosed with reference to its preferred embodiments, from reading this description those of skill in the art can appreciate changes and modifications that may be made which do not depart from the scope and spirit of the invention as described above and claimed hereafter. It is intended that the scope of the invention be defined by the claims appended hereto.

What is claimed is:

1. A process for forming a dense, ceramic, polycrystalline structure from ceramic powder, comprising placing only ceramic powder into a metal container and then sealing the ceramic powder inside the metal container under a vacuum, and then forcing the sealed, evacuated container through a severe deformation channel at an elevated temperature below the melting temperature of the ceramic powder, whereby a dense ceramic polycrystalline structure is formed inside the container.

2. The process of claim 1, wherein the dense ceramic, polycrystalline structure is a fully dense structure.

3. The process of claim 1, wherein the dense, ceramic polycrystalline structure is essentially crack-free.

4. The process of claim 1, wherein the ceramic powder inside the metal container is ceramic nanopowder, and wherein the dense ceramic polycrystalline structure is a dense, ceramic nanocrystalline structure.

5. A process for continuously forming dense, ceramic, polycrystalline structures from ceramic powder, comprising feeding powder that is only ceramic powder inside a channel of an equal channel angular extrusion die, the ceramic powder blocked from flowing through the die by a movable spacer resting on a dense object inside the channel, the die heated at a temperature below the melting temperature of the ceramic powder in the die, and after a desired amount of powder has been fed into the die, compressing the powder inside the channel and then forcing the compressed powder through the die, whereby a dense, ceramic polycrystalline structure is formed.

6. The process of claim 4, wherein the dense ceramic nanocrystalline structure formed inside the container is a dense, ceramic nanocrystalline phosphor.

* * * * *